(12) United States Patent
Altevogt et al.

(10) Patent No.: US 10,649,781 B2
(45) Date of Patent: *May 12, 2020

(54) ENHANCED PERFORMANCE-AWARE INSTRUCTION SCHEDULING

(71) Applicant: INTERNATIONAL BUSINESS MACHINES CORPORATION, Armonk, NY (US)

(72) Inventors: Peter Altevogt, Ettlingen (DE); Cédric Lichtenau, Stuttgart (DE); Thomas Pflueger, Leinfelden (DE)

(73) Assignee: International Business Machines Corporation, Armonk, NY (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/842,955

(22) Filed: Dec. 15, 2017

(65) Prior Publication Data
US 2019/0095214 A1 Mar. 28, 2019

Related U.S. Application Data

(63) Continuation of application No. 15/714,091, filed on Sep. 25, 2017.

(51) Int. Cl.
*G06F 9/38* (2018.01)
*G06F 9/48* (2006.01)

(52) U.S. Cl.
CPC .......... *G06F 9/3838* (2013.01); *G06F 9/4881* (2013.01)

(58) Field of Classification Search
CPC .... G06F 9/3855; G06F 9/3838; G06F 9/3851; G06F 9/3836; G06F 9/4881
See application file for complete search history.

(56) References Cited

U.S. PATENT DOCUMENTS 4,891,753 A 1/1990 Budde et al.
5,699,537 A * 12/1997 Sharangpani ......... G06F 9/3822
712/217

(Continued)

FOREIGN PATENT DOCUMENTS

JP 2017102919 A 6/2017

OTHER PUBLICATIONS

IBM, List of IBM Patents or Patent Applications Treated as Related, Appendix P, dated Dec. 21, 2017, 2 pages.

(Continued)

*Primary Examiner* — Eric Coleman
(74) *Attorney, Agent, or Firm* — Anthony M. Pallone

(57) ABSTRACT

The present disclosure relates to a method for instruction processing with a processor having multiple execution units. The processor includes a dependency cache containing instructions in association with respective execution unit indicators. The method includes: tracking the number of dependent instructions currently assigned to each execution unit of the processor respectively. In response to receiving an instruction of a dependency chain, the execution unit assigned to a previous instruction of the dependency chain on which depends the received instruction may be identified in the dependency cache. In case more than a predefined maximum number of dependent instructions of at least one dependency chain is currently assigned to the identified execution unit, another execution unit of the processor may be selected for scheduling the received instruction, otherwise the received instruction may be scheduled on the identified execution unit.

8 Claims, 3 Drawing Sheets

(56) References Cited

U.S. PATENT DOCUMENTS

| | | | |
|---|---|---|---|
| 5,802,386 A | 9/1998 | Kahle et al. | |
| 5,835,745 A | 11/1998 | Sager et al. | |
| 5,884,060 A | 3/1999 | Vegesna et al. | |
| 7,418,576 B1* | 8/2008 | Lindholm | G06F 9/3838 712/214 |
| 8,364,936 B2 | 1/2013 | Beaumont-Smith et al. | |
| 8,612,957 B2 | 12/2013 | Guo et al. | |
| 10,303,481 B2 | 5/2019 | Altevogt et al. | |
| 2002/0004895 A1* | 1/2002 | Corwin | G06F 9/3836 712/214 |
| 2002/0087833 A1 | 7/2002 | Burns et al. | |
| 2003/0126408 A1* | 7/2003 | Vajapeyam | G06F 9/3808 712/214 |
| 2010/0250900 A1* | 9/2010 | Brown | G06F 9/3814 712/208 |
| 2010/0325394 A1 | 12/2010 | Golla et al. | |
| 2013/0297912 A1* | 11/2013 | Tran | G06F 9/3814 712/208 |
| 2013/0346729 A1 | 12/2013 | Barowski et al. | |
| 2015/0100965 A1* | 4/2015 | Tran | G06F 9/5011 718/103 |
| 2016/0378483 A1 | 12/2016 | Burger et al. | |
| 2017/0161077 A1 | 6/2017 | Altevogt et al. | |
| 2017/0161078 A1 | 6/2017 | Altevogt et al. | |

OTHER PUBLICATIONS

Pending U.S. Appl. No. 15/714,091, filed Sep. 25, 2017, entitled: "Enhanced Performance-Aware Instruction Scheduling", 21 pages.

Nagarajan et al., "Instruction Scheduling for Emerging Communication-Exposed Architectures", PLDI, Jun. 2003, 11 Pages, Copyright ACM 2003, San Diego, CA.

Stark et al., "On Pipelining Dynamic Instruction Scheduling Logic", Microarchitecture, Proceedings 33rd Annual IEEE, ACM International Symposium, Dec. 10-13, 2000, pp. 1-10.

Gran et al., "An Enhancement for a Scheduling Logic Pipelined over two Cycles", Albacete, XVII Jornadas De Paralelismo, Sep. 2006, p. 1-6.

Aggrawal, "Single FU Bypass Networks for High Clock Rate Superscalar Processors", HiPC 2004, LNCS 3296, pp. 319-332, 2004.

Hennessy et al., "Computer Architecture, A Quantitative Approach", Fourth Edition, 2007, 705 pages.

Kim et al., "Reducing Operand Communication Overhead using Instruction Clustering for Multimedia Applications", Proceedings of the Seventh IEEE International Symposium on Multimedia (ISM'05), 2005 IEEE, 8 pages.

List of IBM Patents or Patent Applications Treated as Related, (Appendix P), Jul. 22, 2019, 2 pages.

* cited by examiner

ENHANCED PERFORMANCE-AWARE INSTRUCTION SCHEDULING

BACKGROUND

The present invention relates to the field of digital computer systems, and more specifically, to instruction processing with a processor having multiple execution units.

Processors such as superscalar processors, allow parallel execution of several instructions during a single processor cycle due to the availability of a plurality of parallel execution units. Generally, this mechanism increases the processor's performance. However, two consecutive instructions may be dependent on each other. For example, a following instruction may require the result of the preceding instruction. Thus, a scheduling or dispatching of the following instruction has to wait for the preceding instruction to finish. Independent of this, an issuing of instructions to different execution units may be performed without reflecting these special dependencies resulting in performance issues due to the communication delay overhead of results between execution units. Thus, there is a need for improving the scheduling of the dependent instructions.

BRIEF SUMMARY

Various embodiments provide a method for instruction processing with a processor having multiple execution units, a processor unit, and a computer program product as described by the subject matter of the independent claims. Advantageous embodiments are described in the dependent claims. Embodiments of the present invention can be freely combined with each other if they are not mutually exclusive.

In one aspect, the invention relates to a method for instruction processing with a processor having multiple execution units, the processor containing a dependency cache including instructions in association with respective execution unit indicators. The method includes:

Tracking dependent instructions currently assigned to each execution unit of the processor respectively; (e.g. the number of dependent instructions of each dependency chain currently assigned to each of the execution units is tracked) in response to receiving an instruction of a dependency chain, identifying in the dependency cache the execution unit assigned to a previous instruction of the dependency chain on which depends the received instruction.

In case more than a predefined maximum number of dependent instructions of at least one dependency chain are currently assigned to the identified execution unit, selecting another execution unit of the processor for scheduling the received instruction, otherwise scheduling the received instruction on the identified execution unit.

In another aspect, the invention relates to a computer program product including a computer-readable storage medium having computer-readable program code embodied therewith, the computer-readable program code configured to implement all of steps of the method according to preceding embodiments.

In another aspect, the invention relates to a processor unit including multiple execution units, the processor unit containing a dependency cache including instructions in association with respective execution unit indicators. The processor unit is configured for:

Tracking dependent instructions currently assigned to each execution unit of the processor respectively.

In response to receiving an instruction of a dependency chain, identifying in the dependency cache the execution unit assigned to a previous instruction of the dependency chain on which depends the received instruction.

In case more than a predefined maximum number of dependent instructions of at least one dependency chain currently assigned to the identified execution unit selecting another execution unit of the processor for scheduling the received instruction, otherwise scheduling the received instruction on the identified execution unit.

BRIEF DESCRIPTION OF THE DRAWINGS

In the following embodiments, the invention is explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

The US application Ser. No. 20170161078 A1 is fully incorporated herein by reference. In particular, reference is made to the features of the dependency cache.

The present method may enable a combination of dependency aware scheduling with a scheduling ensuring an optimal load balancing. The dependency aware scheduling (e.g. scheduling dependent instructions on a same execution unit) may be restricted only to a few neighboring instructions in a dependency chain. This may have the advantage of both an optimal load balancing and reduced penalty delays due to communication of results between execution units.

According to one embodiment, the selected execution unit is the execution unit with the least number of instructions currently assigned to it. This may provide a systematic and simplified embodiment for selecting an execution unit.

According to one embodiment, the selected execution unit is the execution unit with the least number of cycles required to execute the instructions currently assigned to the selected execution unit.

According to one embodiment, the method further includes tracking the number of any instruction currently assigned to each execution unit of the processor; and using the tracked numbers of any instruction currently assigned to each execution unit of the processor for selecting the execution unit. For example, a first set of instructions dispatched to an execution unit may be defined as the dependent instructions of a dependency chain. A second set of instructions dispatched to an execution unit including any other instructions not part of the first set dispatched to that execution unit. The instructions of both sets determine the utilization level of the execution unit.

Figure 1:
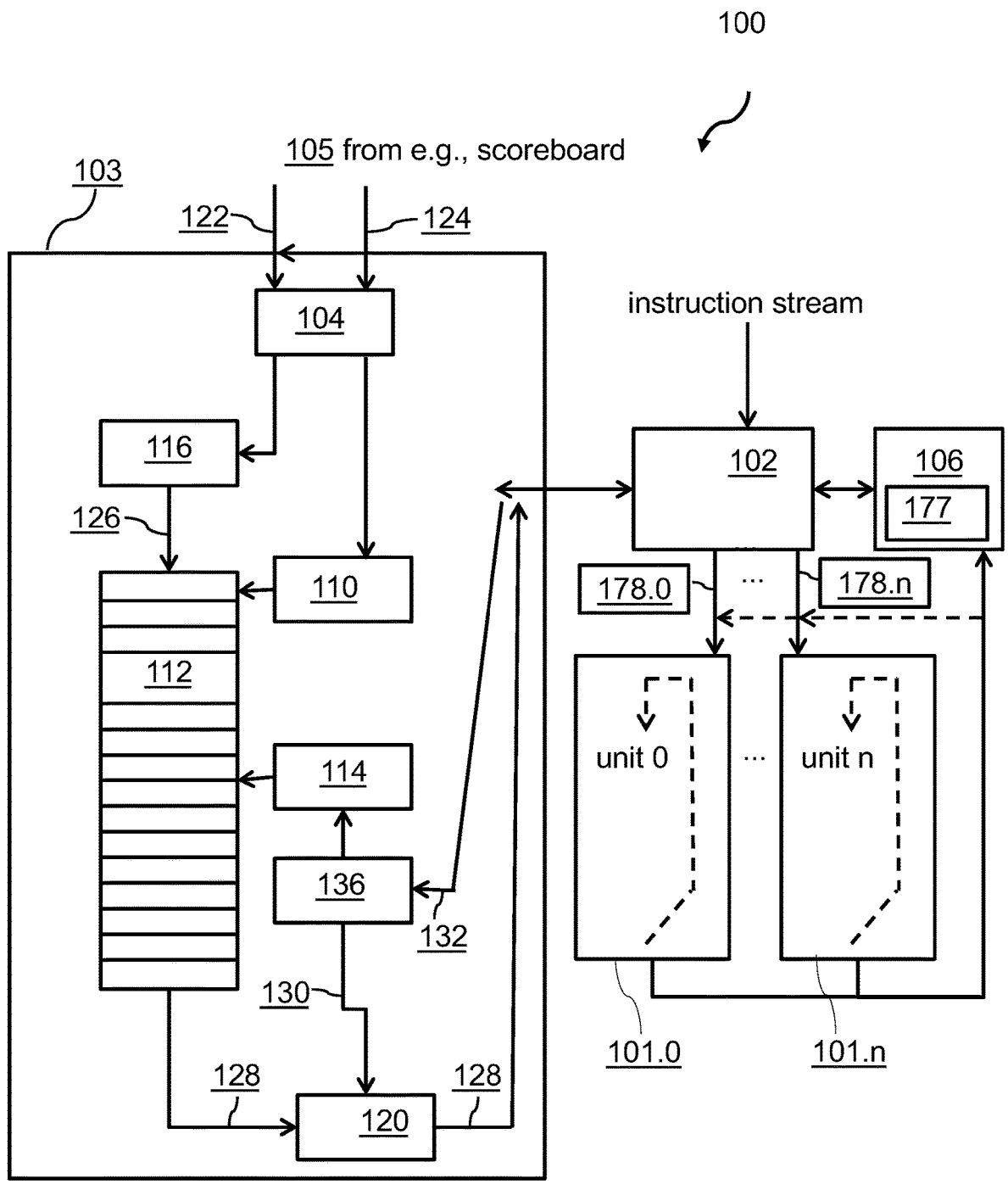
FIG. 1 is a block diagram of an exemplary architecture of a processor unit in accordance with the present disclosure.

FIG. 1 is a block diagram of an exemplary architecture of a processor unit 100 in accordance with the present disclosure. The processor unit 100 may include a plurality of execution units 101.0 to 101.n. As indicated in FIG. 1, an instruction stream may enter an instruction decode and issue unit 102 of the processor unit 100 together with a control unit 106 containing at least a scoreboard to keep track of dependent instructions of the processor unit 100. The processor unit 100 further includes a dependency cache 103. Both, the control unit 106 and the dependency cache 103 interoperate with the instruction decode and issue unit 102. The control unit 106 is shown separated from the instruction decode and issue unit 102. In another example, the control unit 106 may be part of the instruction decode and issue unit 102.

The dependency cache 103 includes a dependency finish logic 104 that may receive, 105, at least 2 input values from the scoreboard 106: an address or execution unit number 122 and an address and/or the type of instruction dependent from finishing/retiring instructions.

In order to best describe the functionality of the dependency cache 103, a sequence of steps may be discussed in the following: the instruction address of the instruction to be issued from the instruction decode and issue unit 102 is used to access the dependency cache 103 to find out where to schedule the instruction to, i.e., to which execution unit. For this, the instruction decode and issue unit 102 sends, 132, the address of the instruction to be issued or scheduled, via the dependency issue and control logic 136, to a second mapping unit 114—which may be implemented as a hashing unit—to read the address of the execution unit where the instruction should be executed from the dependency cache table 112. The second hashing/mapping unit 114 may be used to narrow the address to access the dependency cache table 112.

Next, the dependency cache 103 returns, 128, an execution unit identifier from the dependency cache table 112, via a unit select module 120, back to the instruction decode and issue logic 102. The dependency issue and control logic 136 influences, via 130, the unit select module 120 using the type of instruction to be issued as parameter.

When an instruction finishes, all instructions waiting for the results of the just finished instruction, as flagged by the scoreboard, may be considered. For each of these instructions, the dependent instructions address 124, coming from the scoreboard, is used to access, via the dependent finish control logic 104, the dependency cache 103, in particular the dependency cache table 112, via the unit mapping module 116 and the first mapping unit 110, which may be implemented as a hashing module. The unit mapping module 116 may target a close by execution unit for all dependent instructions of the computer instruction, 126. In this context, the term "close" may mean geometrically close on the processor chip in order to guarantee short wirings—and thus short latency—from one execution unit to another.

Based on the instruction type of the dependent instructions, the closest unit to the finished instruction is selected to update the dependency cache 103, in particular dependency cache table 112 entry for the dependent operation. It may be noted that for a processor chip with equal processing or execution units, the execution unit where the dependent instructions started matches the execution unit where the instructions finished.

The control unit 106 may include a tracking counter 177. The tracking counter 177 includes a counter (currNumOfInsts2Unit) that keeps track of the number of dependent instructions of a respective dependency chain sent to the execution units 101.0-101.n. The counter 177 may be implemented as a discrete counter. In an alternative example, the counter 177 may be part of the dependency cache 103 and may be associated with the respective dependency chain. For example, each instruction in the dependency cache may be associated with an identifier indicating the dependency chain to which belongs the instruction. A single counter 177 is shown for exemplification purpose. The system 100 may include a counter per dependency chain and execution unit such that the number of dependent instructions of a given dependency chain in each of the execution units may be counted.

The instruction decode and issue logic 102 may for example be configured to decode instructions and dispatching them into issue queues which may be part of the instruction decode and issue logic 102 and then decoded instructions are issued from the issue queues to execution units 101.0-101.n.

The control unit 106 uses a pipeline/unit utilization counter 178.0-178.n per execution unit 101.0-101.n in order to track e.g. the number of instructions currently in flight in the pipeline (respectively in the execution unit) or the average expected number of cycles to finish processing of the instructions in the execution unit. The pipeline/unit utilization counters may for example be implemented at issue queues linked to the respective execution units 101.0-101.n. For example, for counting the number of instructions at the execution unit 101.0, the counter 178.0 may be configured to count the number of instructions that go to one or more issue queues that issue instructions to the execution unit 101.0.

The instruction decode and issue logic 102 is configured to receive the utilization counter 178.0-178.n. Based on those counters 178.0-178.n and/or the tracking counter 177, the instruction decode and issue logic 102 may decide whether to schedule or not the instruction on the execution unit whose execution unit identifier or indicator is received. This logic 102 may be configured to determine or decide where to dispatch/issue the current instruction. The decision may be based on the dependency information out of dependency cache 103 and the number of dependent instructions sent to the same execution unit (currNumOfInsts2Unit) and/or the execution unit utilization.

The processing unit may further include a conventional instruction cache (not shown) and inter-stage buffers that are used at between stages of processor instructions processing such as an instruction buffer, decode/issuing buffer and completion buffer. For example, an instruction fetched may be deposited in the instruction buffer. The instruction buffer may for example enable the instruction to be executed while fetching a next instruction.

Figure 2:
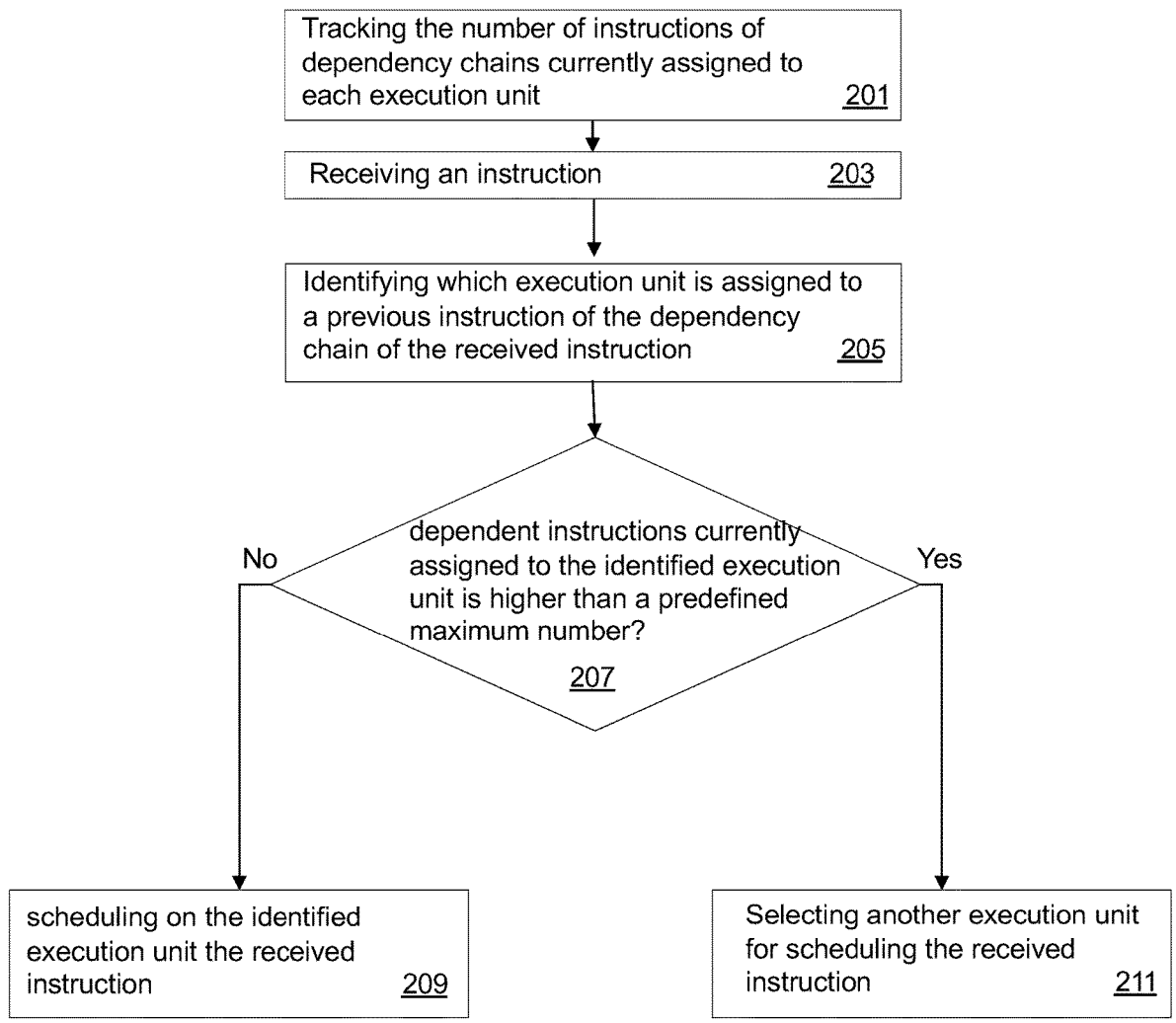
FIG. 2 is a flowchart of a method for instruction processing with a processor in accordance with the present disclosure.

FIG. 2 is a flowchart of a method for instruction processing with a processor e.g. 100 in accordance with an example of the present disclosure.

In step 201, the number of instructions currently assigned to each execution unit 101.0-101.n of the processor 100 may respectively be tracked. This may for example be performed using counters 177 and 178.0-178.n. For example, each time a counter has changed (e.g. incremented) the instruction decode and issue logic 102 may receive that counter. Counter 177 may be provided for each dependency chain of instructions. The tracking may be performed to track the dependent instructions of each dependency chain that are dispatched to each of the execution units 101.0-101.n.

In step 203, a current instruction may be received. The current instruction may belong to a dependency chain of instructions and may thus depend on an instruction of the dependency chain. The dependency chain to which belongs the current instruction may be determined upon receiving the current instruction e.g. each received instruction may be associated with an indicator of its dependency chain.

Step 201 may regularly be performed e.g. on a time periodic basis. For example, step 201 may be performed before and/or in parallel to and/or after the execution of step 203.

In step 205, it may be identified (e.g. by control unit 106) in the dependency cache 103, which execution unit is assigned to a previous instruction of the dependency chain on which depends the received current instruction (e.g. and how many instructions of that dependency chain have been scheduled to each of the execution units). For example, if the dependency chain includes a stream of instructions A-C, where C depends on B in that C requires the result of B as input, and B depends on A in that B requires the result of A as input. If for example, the current instruction is C it may be determined if instruction B is stored in the dependency cache. The identification of the instruction B in the cache results also to the identification of the execution unit on which instruction B is scheduled because the execution unit identifier (or indicator) of that execution unit is stored in association with the instruction B.

It may be determined (inquiry 207) if the number of dependent instructions of at least one dependency chain currently assigned to the identified execution unit is higher than a predefined maximum number. This may be performed by comparing the tracking counter 177 of each of the dependency chain whose dependent instructions are scheduled on the identified execution unit and/or the utilization counter 178 of the identified execution unit with the predefined maximum number. The predefined maximum number may for example be user defined e.g. 10.

In case the number of dependent instructions of at least one dependency chain currently assigned to the identified execution unit is higher than the predefined maximum number, another execution unit of the processor unit 100 may be selected or identified in step 211 for scheduling the received instruction on the selected execution unit, where the selection is performed such that the processor performance is maximized. The predefined threshold may be chosen such that the selected execution unit is the execution unit with the least number of instructions currently assigned. In another example, the predefined threshold is the number of cycles required to execute the instructions assigned to a particular execution unit. In other terms, the selected execution unit is the one enabling the highest performance. Otherwise, in case the number of dependent instructions of each dependency chain whose dependent instructions are scheduled on the identified execution unit is smaller than the predefined maximum number, the received current instruction may be scheduled in step 209 on the identified execution unit.

Each received current instruction may further be processed in order to be stored or not stored in the dependency cache using the method of the US application Ser. No. 20170161078 A1. For example, if a next or future instruction of the dependency chain may depend on the result of the received instruction, the method further includes storing in the dependency cache the current instruction in association with an indicator of the identified or selected execution unit on which the received instruction is scheduled.

Steps 203-211 may be repeated for each received instruction. Step 201 may be regularly performed e.g. in parallel to the execution of steps 203-211.

Figure 3:
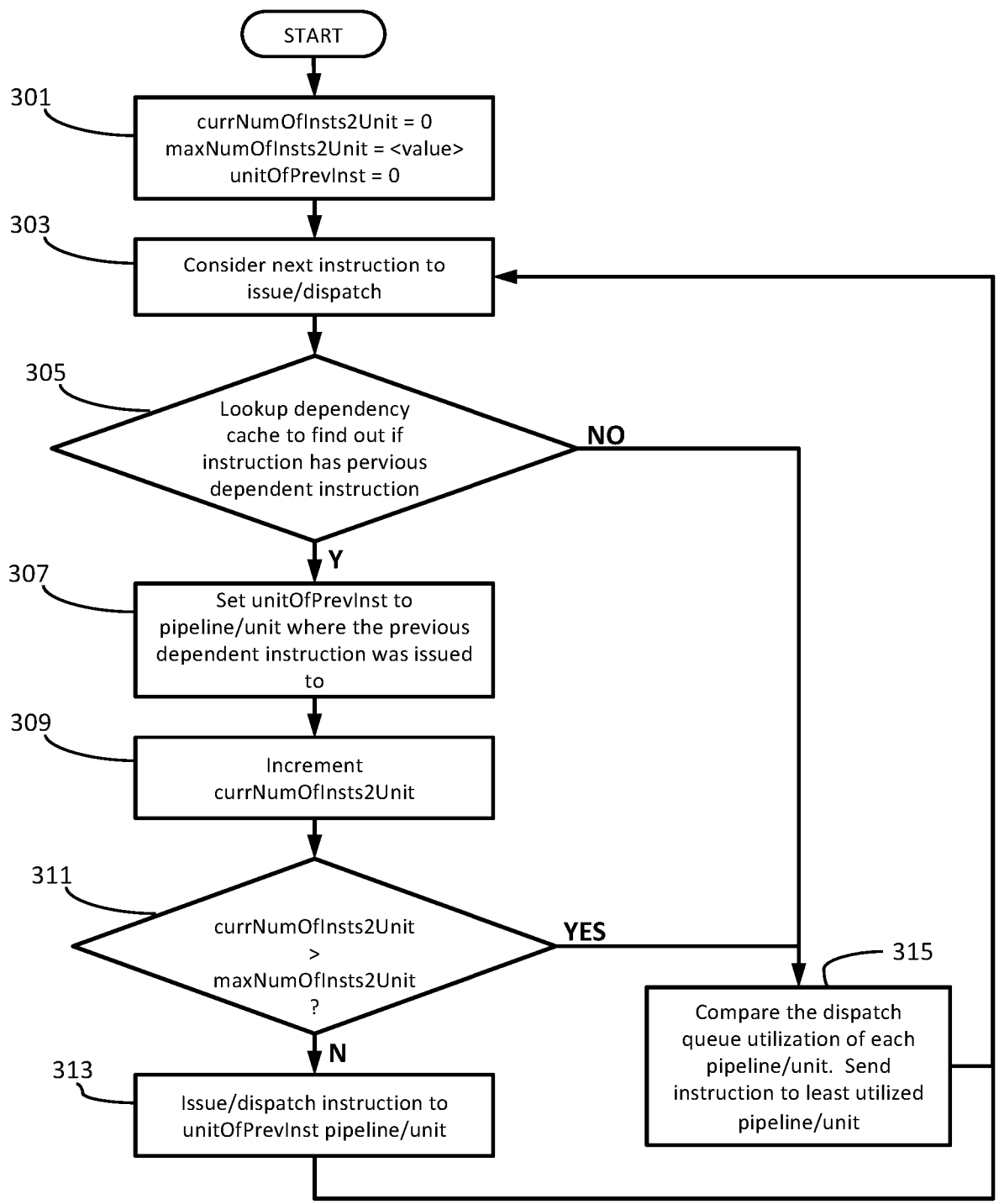
FIG. 3 is a diagram for an exemplary method for scheduling an instruction in accordance with the present disclosure.

FIG. 3 is a diagram for an exemplary method for scheduling an instruction in accordance with the present disclosure.

At the beginning, in step 301, the tracking counter 177 (referred to as currNumOfInsts2Unit) associated with each of the execution units 101.0-101$n$ may be set to zero. In addition, the predefined maximum number of instructions may be set as well. In this example of FIG. 3, the maximum number of instructions is referred to as maxNumOfInsts2Unit. Another variable or parameter referred to as unitOfPrevinst indicates the identifier of an execution unit. In step 301 it may be initialized to zero.

In step 303, a current instruction to consider for issuing or scheduling may be received.

The dependency cache 103 may be looked up or searched in order to find out if (inquiry 305) the current instruction has previous dependent instruction.

If the current instruction has a previous dependent instruction, the variable unitOfPrevinst may be set in step 307 to execution unit identifier of the execution unit where the previous dependent instruction was issued to (or scheduled on).

In step 309, the tracking counter currNumOfInsts2Unit may be incremented e.g. by 1.

The incremented currNumOfInsts2Unit may be compared (inquiry 311) to the maximum number of instructions maxNumOfInsts2Unit.

If the currNumOfInsts2Unit is smaller than the maximum number of instructions maxNumOfInsts2Unit, the current instruction may be issued in step 313 to the execution unit having the identifier unitOfPrevInst.

If the current instruction has a no previous dependent instruction step 315 may be executed. In one example, the current instruction may be issued in step 315 to a least utilized execution unit. The execution unit with least utilization (e.g. least number of instructions stored in a reservation station) may be identified using the utilization counters 178.0-178.$n$.

In an alternative example, step 315 may include using an issue/dispatch algorithm such as round-robin algorithm to select the execution unit for the current instruction. Thus, this method may restrict dependency aware scheduling only to a few neighboring instructions in a dependency chain and use a conventional issue/dispatch algorithm such as round-robin otherwise.

In another alternative example, step 315 may include issuing the current instruction to an execution unit having the following identifier: (unitOfPrevinst+1) MOD totalNumOfUnits. Where totalNumOfUnits is the total number of execution units 101.0-101-$n$.

After executing issuing step 313 or 315 of the current instruction, steps 303-315 may be repeated for a next instruction, wherein the next instruction may be part of the dependency chain (or stream) of the current instruction or other streams.

In another example, a method (referred to as clause 1) for instruction processing with a processor having multiple execution units is provided. The processor includes an instruction decode and issue logic for assigning instructions for execution to one of the execution units, wherein register access conflicts between subsequent instructions are resolved by a dependency cache with the following steps: receiving from the instruction decode and issue logic an execution unit indicator indicative of the execution unit the instruction is planned to be executed on; recognizing dependent instructions of said instruction at execution completion time of instructions; storing the received execution unit indicator in the dependency cache with indicators for the recognized instruction dependencies; requesting the execution unit indicator for an instruction from the dependency cache by the instruction decode and issue logic; selecting an execution unit such that the processor instruction throughput is increased; providing the execution unit indicator for the selected execution unit; and assigning the instruction to one respective of the execution units dependent on the execution unit indicator received from the dependency cache. The method characterized by tracking the number of instructions currently assigned to each execution unit respectively; in the selection step selecting the execution unit assigned to the previous instruction in the dependency chain of the instruction unless more than a maximum number of instructions are currently assigned to the execution unit, otherwise selecting the execution unit with the least number of instructions currently assigned.

For example, the control logic is implemented as a scoreboard control logic. The method to clause 1 also includes storing indicators for instructions dependent on the planned instruction. The method of clause 1, also includes recognizing dependent instructions of the instruction at execution completion time of an instruction. The method of clause 1, also includes tracking the recognized instruction dependencies. The method of clause 1, also includes selecting a best execution unit or processor core, or processor slice, or processor pipeline such that a program execution time is reduced. The method of clause 1, also includes determining addresses of entries in the dependency cache by a first mapping unit for writing into the storing logic. The method also includes determining addresses of entries in the dependency cache by a second mapping unit for reading out of the storing logic.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for instruction processing by a processor having multiple execution units, wherein the processor having multiple execution units comprises a dependency cache containing instructions associated with respective execution unit indicators, and wherein an execution unit indicator identifies an execution unit, of the multiple execution units, on which an instruction, of the instructions, is planned to be executed on, and wherein the respective execution unit indicators are stored with the instructions, the method comprising:

tracking dependent instructions currently assigned to each respective execution unit of the processor;

in response to receiving an instruction of a dependency chain, identifying in the dependency cache the execution unit assigned to a previous instruction of the dependency chain on which the received instruction depends; and in response to more than a predefined maximum number of dependent instructions of the dependency chain are currently assigned to the identified execution unit, selecting another execution unit of the processor having multiple execution units for scheduling the received instruction.

2. The method of claim 1, further comprising:

in response to less than a predefined maximum number of dependent instructions of the dependency chain are currently assigned to the identified execution unit, scheduling the received instruction on the identified execution unit.

3. The method of claim 1, wherein the selected another execution unit of the processor has the least number of instructions currently assigned.

4. The method of claim 1, wherein the selected another execution unit of the processor unit requires the least number of cycles to execute instructions currently assigned.

5. The method of claim 1, further comprising:

tracking the number of any instruction currently assigned to each respective execution unit of the processor; and using the tracked numbers for selecting the execution unit.

6. The method of claim 1, further comprising in case an instruction of the dependency chain of the received instruction requires the results of the received instruction, storing the received instruction in the dependency cache in association with an indicator of the selected execution unit on which the received instruction is scheduled.

7. The method of claim 1, further comprising in case an instruction of the dependency chain of the received instruction requires the results of the received instruction, storing the received instruction in the dependency cache in association with an indicator of the identified execution unit on which the received instruction is scheduled.

8. The method of claim 1, the dependency chain comprises the dependency chain of the received instruction.

* * * * *